UNITED STATES PATENT OFFICE 2,233,974

SLOW SETTING CEMENT

Thomas H. Dunn, Tulsa, Okla., assignor to Stanolind Oil & Gas Company, Tulsa, Okla., a corporation of Delaware No Drawing. Application June 22, 1939,
Serial No. 280,586

9 Claims. (Cl. 106—24)

This invention relates to slow setting cements and a method of making them, and more particularly to slow setting cements used in cementing operations in oil and gas well work.

Large quantities of cement are used in oil wells in cementing casing to exclude water, in cement squeeze jobs, and in other phases of oil field practice well known to those familiar with the art. Cement is placed at the desired point in various ways such as pumping the cement through the casing or tubing, or lowering the cement into the hole by means of a dump bailer or other methods. It is essential that the cement does not set before it is placed in the desired position and it is desirable that the cement be as fluid as the particular job permits. For deep well cementing ordinary oil well cement is unsuitable largely because of the decreased setting time of the cement due to relatively high subsurface temperatures and pressures. In many instances before ordinary cement can be placed in position, a stiffening or gelling of the slurry occurs which requires abnormal pump pressures to complete the job.

In addition to rendering a cement difficult to pump and decreasing the time required for gellation to occur within the cement slurry, deterioration of the cement itself results when the cement is agitated during this stiffening or gelling period.

In plug back and squeeze cementing where the slurry is required to be forced out into the water-bearing formations, the cement comes to rest, or nearly so, under high temperature conditions. Also a considerable length of drill pipe or tubing must be worked into a body of cement in the hole. The first danger is that the slurry will gel, thus making a satisfactory job impossible. The second danger is that of sticking the pipe. A cement which remains fluid for a comparatively long period removes the hazard and improves the results of this type of job.

The foregoing is not intended to cover all phases of oil well cementing but is mentioned to show the desirability of retarding the setting time of ordinary Portland cement as well as to decrease the viscosity and gel strength of the cement slurry.

It is an object of this invention to overcome the difficulties above mentioned. Another object of my invention is to produce new and improved slow setting cements. A further object of this invention is to provide new methods of making slow setting cements. A still further object of this invention is to provide slow setting cements having improved properties for use under high pressure conditions encountered in oil and gas wells. Other and more detailed objects, advantages, and uses of my invention will become apparent as the description thereof proceeds.

Various slow setting cements have been used and proposed in which a number of different materials have been used to delay the setting time. Amongst such materials are the ordinary phosphates, i. e. the normal and acid orthophosphates.

I have found that greatly superior results can be obtained by incorporating in siliceous cements of the general class typified by Portland cements, small qualtities of sodium triphosphate $$(Na_5P_3O_{10})$$

or other alkali metal salt of triphosphoric acid $(H_5P_3O_{10})$.

The compounds useful in accordance with this invention are the alkali metal salts of higher polyphosphoric acids and by this term I include not only the lithium, sodium, potassium, caesium and rubidium salts but also the ammonium salts which are closely related chemically, the mixed alkali metal salts and the corresponding acid salts.

The amount of alkali metal salt of triphosphoric acid used in accordance with my invention varies with the particular cement, the particular phosphate chosen and the amount of retardation desired. In general the amount ranges from .01% to 1.00% and preferably from .03% to .30%.

The amount of retardation available when practising my invention makes possible the use of my new treated cements under field conditions where ordinary cements, or even cements with prior art retarders, would cause great difficulty due to rapid setting. Thus, for instance, if the setting time is low, an enormous amount of cement must be gotten into the well in a very short time, with the result that a large crew of men must be used, with consequent increased expense.

Moreover, cements with prior art retarders which show reasonably satisfactory properties when tested at atmospheric pressure, seem to disintegrate in the well and give complete unsatisfactory results when the temperature and pressure conditions encountered in oil and gas well cementing work, while cements with my retarders, function under the high temperatures and pressures encountered in well operations in the same manner as at atmospheric temperature and pressure.

Another important advantage of my slow setting cements is that the tensile strength is not substantially reduced when using my retarders while most of the prior art retarders cause marked reductions in tensile strength.

Instead of mixing the dry retarder with the dry cement the retarder can be added to the water used in making the slurry or otherwise incorporated in the cement or concrete.

I claim:

1. A method of retarding the setting time of a cement of the Portland cement type which comprises adding thereto a small but effective amount of an alkali metal salt of triphosphoric acid.

2. A method of retarding the setting time of a Portland cement comprising introducing into said cement from about 0.01% to about 1% of an alkali metal triphosphate.

3. A method of retarding the setting time of a cement of the Portland cement type comprising adding thereto from about 0.03% to about 0.3% of an alkali metal triphosphate.

4. A method of cementing a well comprising introducing into said well a cement slurry of the Portland cement type carrying a minor quantity of an alkali metal salt of triphosphoric acid.

5. A method of cementing a well comprising introducing into said well a cement slurry of the Portland cement type carrying from about 0.03% to about 0.3% of sodium triphosphate.

6. A slow setting cement of the Portland cement type comprising a small amount of an alkali metal salt of triphosphoric acid.

7. A slow setting cement of the Portland cement type comprising from about 0.10% to about 1% of sodium triphosphate.

8. A cement of the Portland cement type for use under high pressures comprising from about 0.03% to about 0.3% of an alkali metal salt of triphosphoric acid.

9. A cement slurry of the Portland cement type comprising a small amount of an alkali metal triphosphate.

THOMAS H. DUNN.

CERTIFICATE OF CORRECTION.

Patent No. 2,233,974.

March 4, 1941.

THOMAS H. DUNN.

It is hereby certified that error appears in the printed specification of the above numbered patent requiring correction as follows: Page 1, second column, line 15, for "qualtities" read --quantities--; and that the said Letters Patent should be read with this correction therein that the same may conform to the record of the case in the Patent Office.

Signed and sealed this 1st day of April, A. D. 1941.

Henry Van Arsdale,
Acting Commissioner of Patents.

(Seal)